Patented Dec. 18, 1945

2,391,162

UNITED STATES PATENT OFFICE 2,391,162

INTERPOLYMERS OF ISOBUTYLENE WITH VINYL METHACRYLATE AND THEIR PREPARATION

Denis William Huebner and James Edgar Fearey, Norton-on-Tees, England, assignors to Imperial Chemical Industries Limited, a corporation of Great Britain No Drawing. Application May 18, 1943, Serial No. 487,538. In Great Britain May 18, 1942

6 Claims. (Cl. 260—84)

It is already known that isobutylene and other iso-olefines can be polymerised to form products of high molecular weight, by subjecting them at temperatures below about −10° C., to the action of inorganic halides such as boron fluoride and aluminium chloride.

We have now found that interpolymers of iso-olefines such as isobutylene with vinyl methacrylate can be produced by subjecting a mixture containing an iso-olefine and vinyl methacrylate, to the action of a catalyst of the Friedel-Crafts type, at a temperature below −10° C.

Operating conditions similar to those known for the polymerisation of iso-olefines may be employed. The molecular weights of the interpolymers vary with the reaction conditions such as temperature, presence or absence of solvent, amount and nature of the catalyst, in a manner similar to that already known for the polymerisation of iso-olefines per se. In addition the molecular weight and yield have been found to fall as the proportion of the iso-olefine in the interpolymer decreases, other operating conditions being the same.

Example

A mixture of 18 parts by volume of isobutylene, 2 parts by volume of vinyl methacrylate and 60 parts by volume of petroleum ether, was cooled in a stirred vessel to −80° C., by means of a bath of solid carbon dioxide and methyl alcohol. A quantity of powdered solid carbon dioxide was added to the mixture and 100 parts by volume of gaseous boron trifluoride were then passed through the mixture. The temperature throughout was about −82° C. the polymer so formed was precipitated with methyl alcohol and dried at 100° C. It had a molecular weight of 22,000, an iodine value of 7.3 gms./100 gms.

We claim:

1. A process for the production of an interpolymer of isobutylene and vinyl methacrylate which comprises subjecting a mixture containing isobutylene and vinyl methacrylate to the action of boron trifluoride at a temperature below −10° C.

2. A process for the production of an interpolymer of isobutylene and vinyl methacrylate which comprises subjecting a mixture containing isobutylene and vinyl methacrylate to the action of a Friedel-Crafts catalyst at a temperature below −10° C.

3. A process for the production of an interpolymer of isobutylene and vinyl methacrylate which comprises subjecting a mixture containing isobutylene and vinyl methacrylate to the action of aluminium chloride at a temperature below −10° C.

4. A process for the production of an interpolymer of isobutylene and vinyl methacrylate which comprises subjecting a mixture containing isobutylene and vinyl methacrylate to the action of a Friedel-Crafts catalyst at a temperature not exceeding −80° C.

5. The process according to claim 4 wherein the Friedel-Crafts catalyst is boron trifluoride.

6. An interpolymer of isobutylene and vinyl methacrylate.

DENIS WILLIAM HUEBNER.
JAMES EDGAR FEAREY.